(12) United States Patent
Michiels et al.

(10) Patent No.: US 8,724,802 B2
(45) Date of Patent: May 13, 2014

(54) CRYPTOGRAPHIC SYSTEM

(75) Inventors: Wilhelmus P. A. J. Michiels, Eindhoven (NL); Paulus M. H. M. A. Gorissen, Eindhoven (NL); Hendrik D. L. Hollmann, Eindhoven (NL); Ludovicus M. G. M. Tolhuizen, Eindhoven (NL)

(73) Assignee: Irdeto Corporate B.V., Hoofddorp (NL)

( * ) Notice: Subject to any disclaimer, the term of this patent is extended or adjusted under 35 U.S.C. 154(b) by 233 days.

(21) Appl. No.: 12/993,695

(22) PCT Filed: May 12, 2009

(86) PCT No.: PCT/IB2009/051944
§ 371 (c)(1),
(2), (4) Date: Nov. 19, 2010

(87) PCT Pub. No.: WO2009/141756
PCT Pub. Date: Nov. 26, 2009

(65) Prior Publication Data
US 2011/0091033 A1  Apr. 21, 2011

(30) Foreign Application Priority Data
May 20, 2008 (EP) .................................... 08156522

(51) Int. Cl.
*G06F 21/00* (2013.01)
*H04L 29/06* (2006.01)

(52) U.S. Cl.
USPC ............................................................ 380/28

(58) Field of Classification Search
USPC ............................................................ 380/28
See application file for complete search history.

(56) References Cited

U.S. PATENT DOCUMENTS

| | | | |
|---|---|---|---|
| 5,038,376 A | | 8/1991 | Mittenthal ................... 380/37 |
| 5,054,066 A | * | 10/1991 | Riek et al. .................... 380/30 |
| 2003/0091193 A1 | * | 5/2003 | Bunimov et al. ............. 380/278 |
| 2005/0111657 A1 | * | 5/2005 | Lee et al. ..................... 380/28 |
| 2005/0117745 A1 | * | 6/2005 | Lee et al. ..................... 380/30 |
| 2006/0072743 A1 | | 4/2006 | Naslund et al. |
| 2006/0210082 A1 | | 9/2006 | Devadas et al. |
| 2008/0126910 A1 | * | 5/2008 | Venkatesan et al. ......... 714/758 |

FOREIGN PATENT DOCUMENTS

| | | | |
|---|---|---|---|
| JP | H03-85923 | 4/1991 | ........... H03M 13/00 |
| JP | H03-192383 | 8/1991 | ............. G09C 1/00 |
| JP | H06-138820 | 5/1994 | ............. G09C 1/10 |
| JP | 2006-189607 | 7/2006 | ............. G09C 1/00 |

OTHER PUBLICATIONS

Catterall et al., "Public Key Cryptosystem Based Metrics Associated with GRS Code," 2006, IEEE, pp. 729-733.*

(Continued)

*Primary Examiner* — Michael Pyzocha
(74) *Attorney, Agent, or Firm* — Marc S. Kaufman; Reed Smith LLP

(57) ABSTRACT

A method of creating an encryption system for encrypting a plurality of plaintext words is provided. The method comprises associating (104) respective plaintext words (202) with respective sets (207) of error positions (212) of an error vector, and associating (106) respective values of at least one of the plaintext words (202) with respective error vector values, wherein positions of the respective error vector values outside the set (207) of error positions associated with the one of the plaintext words (202) are zero. The method further comprises associating (108) the respective values of the plaintext word (202) with respective representations of respective syndromes (218) of the respective error vectors according to an error correcting code.

18 Claims, 4 Drawing Sheets

(56) References Cited

OTHER PUBLICATIONS

Li et al., "On the Equivalence of McEliece's and Niederrelter's Public-Key Cryptosystems," 1994, IEEE, pp. 271-275.*

Hwang et al., "Secret Error-Correcting Codes," 1990, Springer-Verlag, pp. 540-563.*

Loureiro, Sergio et al., "Function Hiding Based on Error Correcting Codes", 1999, pp. 1-7.*

Sendrier, Nicolas, "On the Security of the McEliece Public-Key Cryptosystem", Information, Coding and Mathematics © Springer Science+Business Media New York 2002, pp. 141-163.*

Metzner, John, "Vector Symbol Decoding With List Inner Symbol Decisions", IEEE Transactions on Communications, vol. 51, No. 3, Mar. 2003, pp. 371-380.*

"International Application Serial No. PCT/IB2009/051944, International Search Report and Written Opinion mailed Nov. 20, 2009", 8 pgs.

Japanese Official Action, dated Jul. 16, 2013 issued in Japanese corresponding Application Serial No. 2011-510070 (3 pages).

* cited by examiner

CRYPTOGRAPHIC SYSTEM

CLAIM OF PRIORITY

This application is a U.S. National Stage Filing under 35 U.S.C. 371 and claims the benefit of priority under 35 U.S.C. §120 to International Patent Application Serial No. PCT/IB2009/051944, filed May 12, 2009, and published on Nov. 26, 2009 as WO 2009/141756 A2, through which the present application also claims the benefit of priority under 35 U.S.C. §119 to European Patent Application No. 08156522.8, filed on May 20, 2008, each of which are incorporated by reference herein in their entirety.

FIELD OF THE INVENTION

The invention relates to cryptography. The invention also relates to a method of creating an encryption or decryption system. The invention also relates to systems and methods for encrypting and decrypting.

BACKGROUND OF THE INVENTION

A public key cipher (also called asymmetric cipher) is a cipher with two different keys: one for encryption and one for decryption. The encryption key is made public so anyone can use it, while the decryption key is kept secret. There are only a few public key ciphers known. Some known public key ciphers are RSA, Elliptic curves, McEliece, and Hidden Field Equations. When compared with symmetric ciphers, public key ciphers are relatively expensive in terms of, for instance, computing power, hardware cost, and/or time complexity. This makes current public key ciphers less useful for applications with cheap, resource-limited devices, such as sensors.

Niederreiter presented a variant of the McEliece encryption scheme that is based on linear error correcting codes. In Niederreiter's encryption scheme, a plain text message is interpreted as an error vector, and a ciphertext message is based on a syndrome of the error vector. Consequently, encryption may involve computing the syndrome of the error vector, and decryption may involve computing the error vector from the syndrome, in accordance with the particular error correcting code used. Because of the properties associated with error correcting codes, the error vectors can only have a limited number of ones. Consequently, the plaintext messages, which may have any number of ones, are first converted into error vectors with limited number of ones. This conversion step can take a considerable amount of computation time.

SUMMARY OF THE INVENTION

It would be advantageous to have an improved method of creating an encryption system or decryption system. To better address this concern, in a first aspect of the invention a method is presented that comprises associating respective plaintext words with respective sets of error positions of an error vector; and associating respective values of at least one of the plaintext words with respective error vectors which have identical values at positions outside the set of error positions associated with the one of the plaintext words.

These associations allow for an efficient encryption or decryption. Since the respective plaintext words are associated with respective sets of error positions, and the error vectors associated with the respective possible values of a plaintext word have same values outside the positions in the respective set, it becomes possible to establish the value of a position of the error vector by considering only the plaintext word or words associated therewith. In other words, for establishing a value of a position of the error vector not associated with a particular plaintext word, it is not necessary to take the value of this particular plaintext word into account. This reduces the complexity of the preprocessing step. Moreover, in a decrypter the associations may be used to more efficiently obtain a plaintext word from an error vector. This aspect of the invention allows for efficient conversion from plaintext to error vector related quantities, because the conversion can be performed by evaluating individual plaintext words and combining the resulting error vectors of these individual plaintext words in a relatively efficient way.

The respective plaintext words may correspond to a sequence of words, for example a sequence of words in a plaintext block. There may be a fixed, or a predetermined relation between the sequential position of a plaintext word in a plaintext block and the respective set of error positions associated therewith. The respective values of a plaintext word are the respective values such a plaintext word may have, for example the range of values that can be composed with the bits of the plaintext word. Different values of a plaintext word are associated with different error vectors, by varying the value of the error vector at the positions associated with the respective plaintext word. A position of the error vector outside the set of error positions may be kept at a fixed value for all error vectors associated with the plaintext word. In principle, such a fixed value may be different for the different positions outside the set of error positions. In an exemplary embodiment, the values of an error vector are zero outside the associated set of error positions.

In an embodiment, the respective values of the plaintext word are associated with respective representations of respective syndromes of the respective error vectors according to an error correcting code. By means of this direct association between the plaintext words and representations of syndromes, a very efficient encryption system is produced, because it becomes unnecessary to compute the error vector itself.

In an embodiment, the respective representations associated with the respective values of a plaintext word span a linear space having a dimension at least as large as, or preferably larger than, a dimension of a linear space spanned by the respective values of the plaintext word. This makes it more difficult to attack the resulting cryptographic system in particular applications such as white-box cryptography.

In an embodiment, the respective sets of error positions are mutually disjunct. This way, only a single plaintext word needs to be considered to establish the value of an error vector position. This allows to provide an efficient encryption system and/or decryption system.

The various associations established may be provided to an encryption system by means of one or more look-up tables, which make encryption a matter of performing a plurality of look-up operations and combining the results of the look-up operations.

Another aspect of the invention provides a system for encrypting a plurality of plaintext words, comprising a plurality of respective look-up tables corresponding to respective plaintext words, wherein a look-up table corresponding to a plaintext word is arranged for associating respective values of that plaintext word with respective representations of respective syndromes based on respective error vectors, wherein the respective error vectors are zero outside a set of error positions associated with the plaintext word; and a ciphertext generator for combining the representations associated with the respective values of the respective plaintext words into a ciphertext block.

This system for encrypting is relatively efficient because it uses the associations stored by means of look-up tables to perform the conversion of plaintext into an appropriate ciphertext.

Other aspects of the invention are defined in the independent claims. The dependent claims define advantageous embodiments.

BRIEF DESCRIPTION OF THE DRAWINGS

These and other aspects of the invention will be further elucidated and described with reference to the drawing, in which.

DETAILED DESCRIPTION OF EMBODIMENTS

In the following, embodiments will be discussed which are based on Niederreiter's encryption scheme. However, this is not a limitation. Variations of Niederreiter's encryption scheme may be used as well as other encryption schemes. The encryption part is made efficient with respect to resources and computation time used. Moreover, the decryption can be performed in a relatively simple way.

Niederreiter presented a variant of the McEliece encryption scheme that is based on linear error correcting codes. The idea behind Niederreiter's encryption scheme is that a plain text message is interpreted as an error vector. The cipher text is based on the syndrome associated with this error vector. More precisely, if e is an error vector corresponding to a plaintext message, then the encryption can be implemented by a matrix multiplication H*e for some matrix H*. Here, the matrix H* is given by H*=SHQ, where S is a randomly chosen invertible matrix, H is a parity check matrix for the linear code under consideration, and Q is a randomly chosen permutation matrix. The decryption comprises the inverses of S and Q, as well as performing the decoding process of the error correcting code, i.e., deriving the error e from its syndrome H. If the code is t-error correcting, then this procedure is only guaranteed to work if the Hamming weight of the error vector e (i.e., the number of ones in e) is at most t. Hence, the encryption scheme may be extended with a preprocessing step in which an arbitrary plaintext message is mapped to an error vector with Hamming weight at most t. Niederreiter's encryption scheme does not specify this mapping. If, for example, a product code is used, it may be possible to use error vectors with more than t errors. However, in such a case it would be necessary to make sure that only error vectors are used which are capable of being reconstructed based on their syndromes.

In Henk C. A. van Tilborg (Ed.): Encyclopedia of Cryptography and Security. Springer 2005, ISBN 978-0-387-23473-1, in a section entitled "Niederreiter encryption scheme", it is noted that there is a one-to-one correspondence between words of weight t and length n with the integers in the interval $$\left[1, \binom{n}{t}\right].$$

Computing this correspondence exactly is relatively expensive (quadratic in the block length n). Also, approximate solutions exist with a cost proportional to the block length n.

Figure 1:
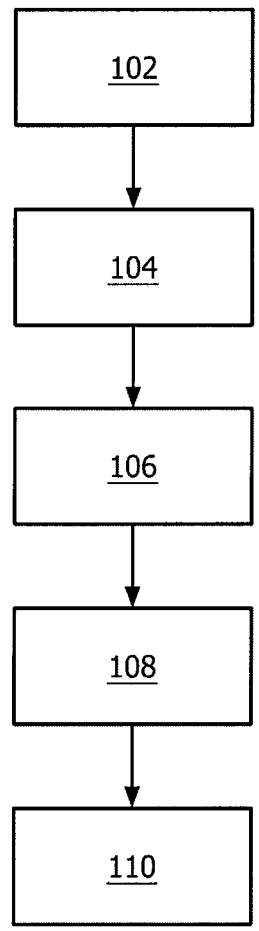
FIG. 1 illustrates processing steps of a method of creating a cryptographic system.

FIG. 1 illustrates an embodiment of a process of creating an encryption system, i.e., an encrypter. Such an encryption system may comprise hardware components, for example a chip comprising an electronic circuit capable of performing cryptographic processing. The encryption system may also be implemented in part or completely in software. The process helps to make the encrypter more efficient. Also, the process disclosed herein provides an efficient way of creating an encryption system. The process is described below also with reference to FIG. 2, which diagrammatically illustrates a plurality of plaintext words 206, an error vector 210, and a plurality of syndrome values 220, as well as associations between the plaintext words and positions of the error vector (at 207) and associations between error vector values and syndromes (at 214).

The process may create the complete encryption system. However, it is also possible to merely generate a set of parameters which can be used in conjunction with an existing parameterized encryption system. Such parameters may comprise a key of the cipher applied in the encryption system or values derived from such a key which are used in the encryption system to perform processing steps of an encryption process.

In step 102, an error-correcting code may be established. Such error-correcting codes, including for example linear codes such as the known BCH codes or the known product codes, were originally developed for correcting errors in data transmitted via a transmission channel. Typically, the error correcting code allows to derive from a received data block possibly containing errors a vector called a syndrome. Usually, a one-to-one relation exists between the errors made and the syndrome. Error correction schemes known in the art may be applied to find the errors based on the syndrome. However, it is not trivial to find these errors based on the syndrome without knowledge of the parameters of the error correcting code (such as the parity check matrix, for example). Because of this property, it is possible to encrypt data in the form of a syndrome of an error vector. The conversion from the plaintext into an error vector may be parameterized; these parameters may form part of the cryptographic key.

Figure 2:
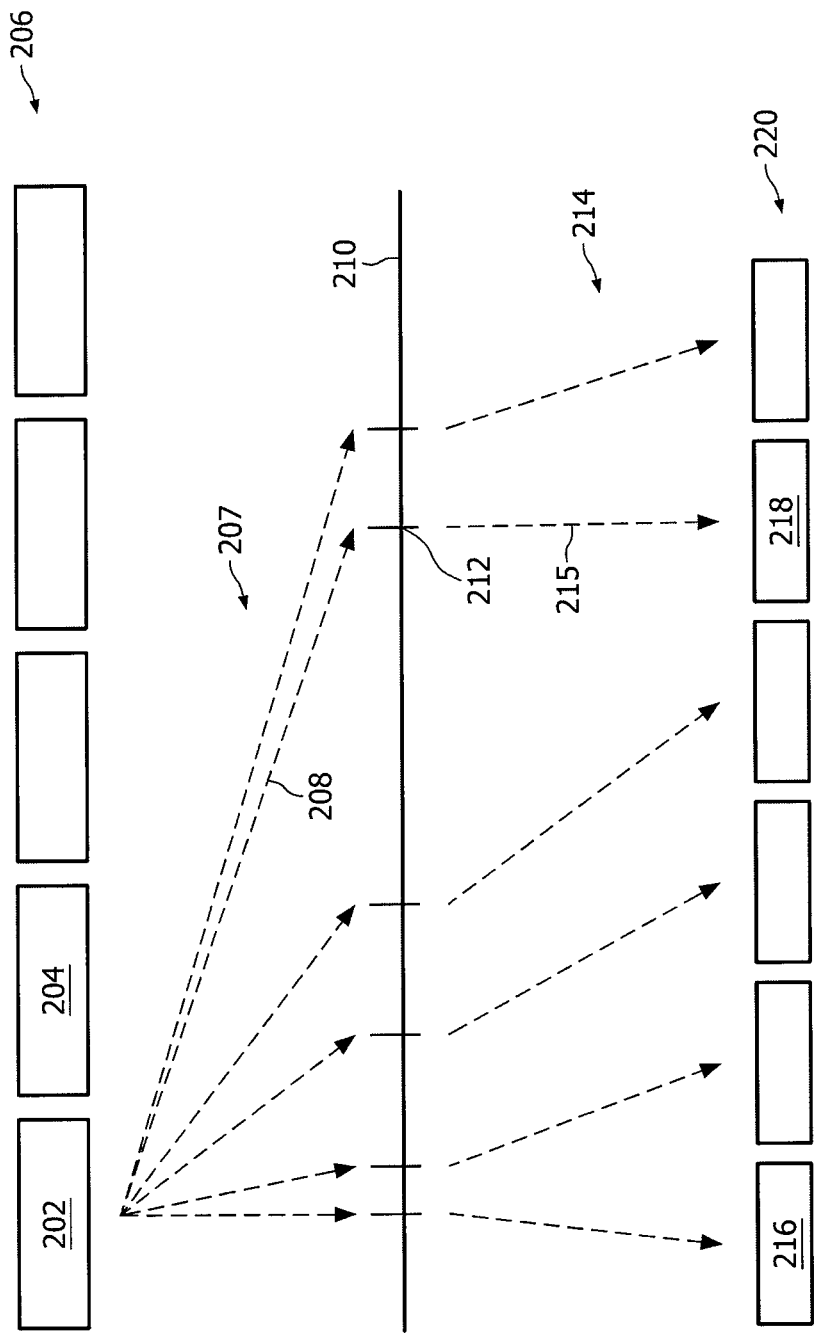
FIG. 2 illustrates several associations used for encrypting and decrypting.

In step 104, respective plaintext words 202,204 are associated with respective sets of error positions of an error vector. The respective plaintext words are, for example, a number of words included in a plaintext block which is to be encrypted. For example, a plaintext block comprises a plurality 206 of plaintext words. These plaintext words may be arranged in a sequence. The respective plaintext words 202,204, in the plurality 206 of plaintext words may be associated with respective sets of error positions, according to their position in the sequence. In FIG. 2, plaintext word 202 is associated with a set of error positions 207, which is indicated in the figure by means of dashed arrows pointing at positions of an error vector 210 which are in the set. For example, plaintext word 202 is associated with the positions pointed at by arrows 207, for example arrow 208 points to position 212 of error vector 210. These positions may be selected randomly. However, preferably no two plaintext words 202,204 are associated with the same error position 212. So, the sets of error positions are preferably disjunct. This simplifies the encryption and/or decryption process.

In step 106, respective values of a plaintext word, for example plaintext word 202, are associated with respective error vector values. The positions of the respective error vector values outside the set 207 of error positions associated with the plaintext word 202 are zero. Preferably a one-to-one mapping between plaintext word values and error vector values is established in this step by means of the associations. For example, the number of error positions in the set is at least one less than the number of possible values of the plaintext word 202. In this case, one plaintext word value can be associated with the zero error value, and the other plaintext word values can be mapped to a unique error vector value comprising zeros at all positions except for one position 212 in the set 207. So, different plaintext word values are mapped to a one at different positions in the set 207. However, other arrangements are also possible. For example, it is possible to allow at most two positions in the set 207 to be set to 1. In case of non-binary codes, error positions can get values different from 0 and 1, depending on the plaintext word value.

In an alternative embodiment, in step 106 the respective error vector values outside the set 207 of error positions are not all set to zero. For example, each error vector position outside the set 207 of error positions is assigned a single value. The error vector position outside the set 207 may get this value for all the plaintext word values which a particular plaintext word may assume. For example, all positions outside the set 207 are set to 1. Alternatively, some positions outside the set 207 may be set to 1 and other positions outside the set 207 may be set to 0.

Step 106 may be repeated for each of the plaintext words in the plurality of words. For each respective plaintext word 202, 204, the respective set 207 of error vector positions 212 is used. The associations may be chosen randomly to increase the security of the cipher. Alternatively, a predetermined scheme may be used for the associations.

This process, so far, results in a mapping of values of plaintext blocks 206 onto values of an error vector 210. The encryption system may, when processing a concrete plaintext block comprising a plurality of plaintext word values, find the error vector value associated with each plaintext word, and add these error vector values to obtain a single error vector value representing the complete plaintext block. Since the plaintext words are associated with different error vector positions, no information is lost by adding the error vectors. Instead of using addition, other ways of combining the error vectors into a single error vector may be used, under the constraint that the error vector values associated with each plaintext word can be recovered from the combined, single error vector. In the case of binary error vectors, the addition may be modulo 2, which corresponds to an efficient XOR operation.

The process may comprise, in step 108, associating the respective values of a plaintext word 202 with respective syndromes 218 of the respective error vectors according to an error correcting code. More particularly, the respective values are associated with respective representations of the respective syndromes. The syndrome of an error vector follows from the code used.

This step may comprise choosing a random linear invertible operator. This random linear operator may be applied to the syndrome to obtain the representation of a syndrome. Such a random linear invertible operator further enhances the security of the cipher. The same operator is preferably applied to all syndromes of all plaintext words. This allows the inverse operator to be applied by the decoder on the received ciphertext to obtain the syndrome corresponding to the encrypted message.

The encryption system may, rather than computing and/or adding of the error vectors, use the association to find the syndromes, add the syndromes to obtain an added syndrome, and apply the random invertible linear operator to the added syndrome. This avoids the necessity of establishing the error vector(s) explicitly, which reduces the amount of storage space needed to store the error vector(s). Preferably, the encryption system is provided with the direct association of the plaintext words with the associated representations of syndromes (e.g., after having applied the linear invertible operator). This way, the linear invertible operator does not need to be applied in the encryption system which decreases the computational complexity. Also, the size of the key data is reduced. Instead of or in addition to adding the syndromes, other ways of combining the syndromes may also be contemplated.

For example, in step 110, the encryption system may be provided with look-up tables listing the representations of the syndromes associated with the different values of the plaintext words. For example, a separate look-up table is provided for each plaintext word in a plaintext block.

Preferably, the respective representations associated with the respective values of a plaintext word span a linear space having a dimension larger than the dimension of a linear space spanned by the respective values of the plaintext word. For example, if the associations are stored in separate look-up tables for each plaintext word, when such a look-up table is viewed as a binary matrix having a row for each plaintext word value, the rank of the matrix is preferably larger than a bit size of the plaintext word. Preferably the respective representations associated with the respective values of a plaintext word span a linear space having a high rank, such as a rank equal to or close to a dimension of the representations. Such high ranks may be realized by trial and error, for example.

Preferably the respective sets of error positions are mutually disjunct. This way, the individual positions of the error vector depend on a single plaintext word, which makes the determination of the error vector and the syndromes more efficient.

It is possible to reserve different error vector positions for different plaintext word values. In such a case, the respective error vectors associated with the respective plaintext word values have at most one nonzero position 212. This makes the decryption system more efficient, because the nonzero position of an error vector then fully determines the value of a plaintext word.

The respective error vector values associated with the respective values of a plaintext word may be mutually unique. This allows to unambiguously decrypt the ciphertext.

Figure 3:
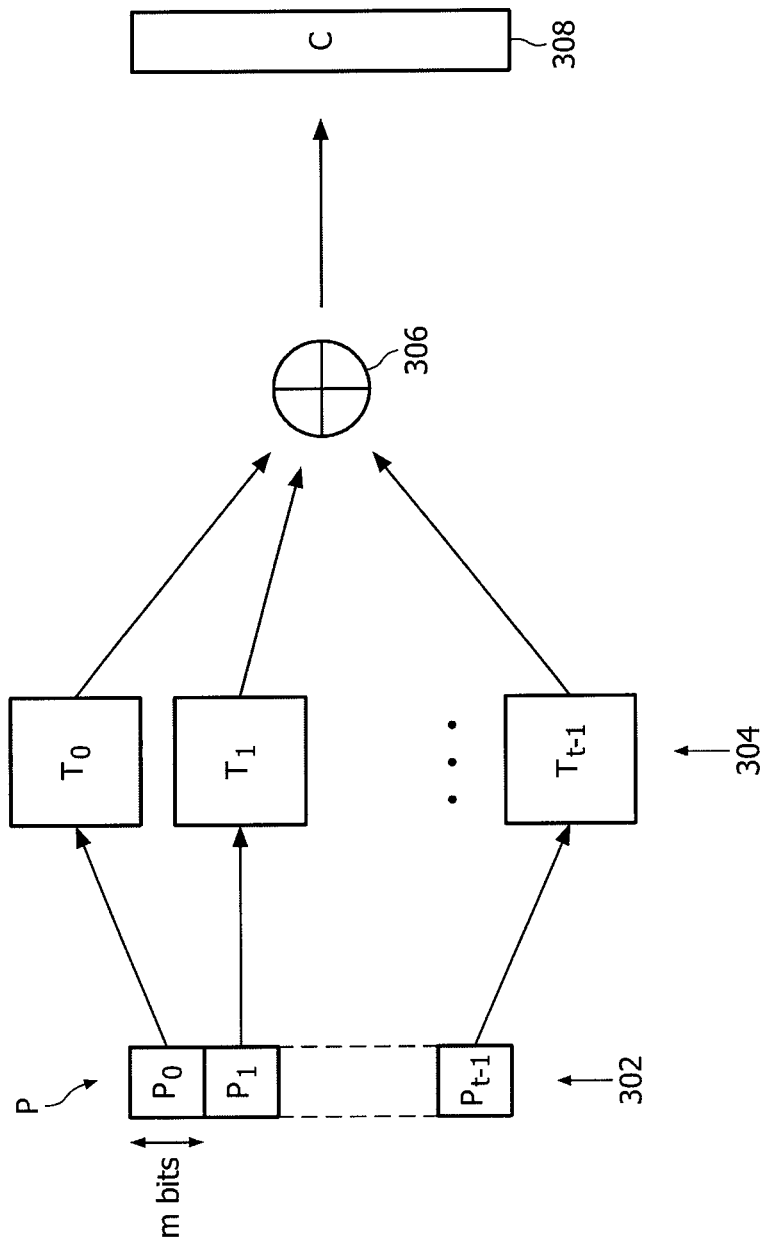
FIG. 3 illustrates a system for encrypting data.

FIG. 3 illustrates a system for encrypting a plurality of plaintext words 202. Such a system may be provided by means of the process described above, for example. The system comprises a plurality of respective look-up tables 304 corresponding to the respective plaintext words, wherein a look-up table corresponding to a plaintext word is arranged for associating respective values of that plaintext word with respective representations of respective syndromes based on respective error vector values, wherein positions of the respective error vector values outside a set of error positions associated with the plaintext word are zero. The system further comprises a ciphertext generator 306 for combining the representations associated with the plurality of plaintext words into a ciphertext block 308. The ciphertext generator 306 may comprise an XOR unit for combining the representations 304 by means of XOR. Such a system is described in more detail hereinafter. Other ways of combining are also possible, for example vector addition.

A method of encrypting a plurality of plaintext words comprises looking up respective representations of respective syndromes associated with respective values of the respective plaintext words 302 in a plurality of respective look-up tables 304 corresponding to the respective plaintext words 302, wherein a look-up table corresponding to a plaintext word is arranged for associating respective values of that plaintext word with respective representations of respective syndromes based on respective error vector values, wherein the respective error vectors are zero outside a set of error positions associated with the plaintext word. The method further comprises combining the representations associated with the plurality of plaintext words into a ciphertext block 308.

A method of decrypting a ciphertext block 308 comprises recovering an error vector corresponding to a syndrome depending on the ciphertext block according to a linear error-correcting code. The method further comprises looking up a respective plaintext word value corresponding to a respective non-zero position of the error vector in a look-up table. Such a relatively simple decryption system using look-up tables is possible in the case where the positions of the error vectors are linked directly to a single plaintext word.

In an embodiment, a look-up table for looking up a value of a respective plaintext word 202 in dependence on at least one value of the error vector at an error position 212 of the error vector associated 208 with the respective plaintext word 202 is provided.

A system for decrypting a ciphertext block 308, comprises a decoder for recovering an error vector corresponding to a syndrome depending on the ciphertext block according to an error-correcting code. The error-correcting code may be a linear error-correcting code. Such a decoder may be based on a known decoding algorithm such as a decoding algorithm for the known BCH code. The system may further comprise a look-up table for looking up a respective plaintext word value corresponding to a respective non-zero bit position of the error vector.

In the following, another embodiment of a mapping of plaintext onto error vectors is disclosed. Moreover, an embodiment is disclosed in which this mapping is used to realize an efficient implementation of the encryption. First, an embodiment of an implementation of the encryption is disclosed. After that, the mapping will be disclosed in more detail. For the remainder of this document, let C denote a fixed binary linear t-error correcting code of length n, say, and let H be an r×n parity-check matrix for C, that is, C consists of the n-bit words c for which Hc=0.

FIG. 3 illustrates a system for encryption, as introduced above. In the following, more optional details of the system for encryption will be discussed. The encryption is based on a collection of t lookup tables $T_0, T_1, \ldots, T_{t-1}$. A plaintext block P consisting of N=t.m bits is split into t words $P_0, P_1, \ldots, P_{t-1}$ of m bits each. For a value i, $0 \le i \le t-1$, a word $P_i$ indicates a row $r_i$ in table $T_i$, and the cipher text C is obtained by XORing the t rows $r_0, r_1, \ldots, r_{t-1}$.

In the following, a process is disclosed which allows to establish a mapping from plaintext to error vectors in the Niederreiter encryption scheme, such that the above encryption system, using look-up tables, can be obtained.

In the context of the encryption system of FIG. 3, with a plaintext block P consisting of N=t.m bits which is split into t words $P_0, P_1, \ldots, P_{t-1}$ of m bits each, an error vector of length n=t·$2^m$31 1 is used. Let V={0, 1, ..., n} be the set of positions (or components) 1, ..., n of the error vector and the value 0.

First, a partition of V into t disjunct sets $V_0, V_1, \ldots, V_{t-1}$ of size $2^m$ each may be chosen. For example, the partition is chosen randomly, because that increases the security.

Second, for i=0, ..., t−1, let $v_i$ be a map from m-bit words to $V_i$. Again, the mappings $v_i$ may be chosen randomly for security reasons. This way, a plaintext word $P_i$ corresponds to a number $v_i(P_i) \in V_i$. This number $v_i(P_i)$ is used as a position, or a component, of the error vector.

This allows to define the error vector e(P) as the n-bit vector having positions or components labeled 1 to n, in which all positions are set to 0 except for the positions $v_i(P_i)$, for i=0, ..., t−1. The latter positions are set to 1. If $v_i(P_i)$ equals 0, it does not add a nonzero component to the error vector. This way, e(P) has a Hamming weight % or t−1. The Hamming weight is t−1 if some $v_i(P_i)$ equals 0.

The error vector e(P) may be encrypted according to the Niederreiter scheme in a way known in the art, by applying SHQ to the error vector e(P), wherein Q is a binary permutation matrix and S is an invertible matrix. However, because of the random partition $V_0, V_1, \ldots, V_{t-1}$ and the random mappings $v_i$, the binary permutation matrix Q may be omitted or the partition and mappings may be changed to absorb Q. Consequently, e(P) is encrypted by applying a matrix SH to the error vector e(P), thereby computing SHe(P), where S is a randomly chosen linear matrix.

Returning to the encryption system of FIG. 3, the entries of the look-up tables $T_i(x)$, for i=0, ..., t−1, and for any m-bit values x (wherein the values x represent possible values of $P_i$), are filled with the columns of SH indexed by $v_i(x)$. In other words, the $v_i(x)$-th column of SH is used as the value of $T_i(x)$. For $v_i(x)$=0, the value of $T_i(x)$ is set to 0. Using these values for the look-up tables of FIG. 3, the encryption system may produce the desired ciphertext. The encryption system thus obtained is highly efficient, as its main operations are table look-ups and XOR operations. The mapping from arbitrary plaintext to error vectors in this embodiment is based on a random partition of n+1 positions into t sets and a random numbering of the positions inside each of these sets.

In the following, a specific embodiment is disclosed. Although this specific embodiment uses particular numbers for block size and the like, these specific numbers are not limiting. For the plaintext a block size of 128 bits and a word size of 8 bits is used. The encryption uses 128/8=16 look-up tables, so one look-up table for each word. These numbers are just exemplarily; the block cipher can be defined for other numbers as well. The block size of the cipher text is larger than the 128 bits for the plain text, namely 192 bits. Hence, the public key cipher incurs a size overhead of 50%. In terms of the variables used in the description relating to FIG. 3, the numbers mentioned are specified by a plaintext block length M=128, a plaintext word size m=8, and a number of plaintext words t=16 in a plaintext block.

The codeword length n, which is equivalent to the length of the error vector, equals $16 \cdot 2^8 - 1 = 2^{12} - 1$, because an 8-bit plaintext word is converted into $2^8$ positions of the error vector, except for one 8-bit plaintext word which is converted into $2^8 - 1$ positions of the error vector.

As error vectors may contain one error for each of the t=16 words, an error correcting code of length $2^{12} - 1$ capable of correcting 16 errors, as known in the art, is employed, for example a BCH code of length $2^{12} - 1$. It is known in the art that the parity check matrix of this BCH code may have 192 rows. That is to say, the syndromes comprise 192 bits. So, a 128 bits plaintext is mapped to a 192-bits syndrome, wherein the syndrome is the basis of the ciphertext.

The private part of the cipher may comprise a randomly chosen 12-bit S-box U that defines a bijective function from $2^8 \times 2^4$ to $2^{12}$. The values of $v_i(x)$ are given by the number from {0, 1, ..., n} that is represented by the binary value U(x,i) and $V_i$ contains the numbers $v_i(x)$ for all bytes x. We note that U absorbs the permutation matrix Q in Niederreiter's encryption scheme. By not restricting U to be a permutation matrix the implementation may gain security.

The private part of the cipher further comprises a randomly chosen 192×192 bit invertible matrix S.

The private part of the cipher may further comprise the $192 \times (2^{12}-1)$-bit parity check matrix H given by a 16-error correcting BCH code. For example, a shortened BCH code may be used.

Let expansion function E be the function from $2^{12}$ to $2^{2^{12}-1}$ that returns on 12-bit input x the $2^{12}-1$ bit output vector that has a 1 on position x and a 0 elsewhere, if x>0, and a zero-vector if x=0. The public part of the cipher may comprise the collection of tables $T_0, T_1, \ldots, T_{15}$, where $T_i$ defines the following function from 8 bits to 192 bits:

$$T_i(x) = S \cdot H(E \cdot U(x,i)).$$

The cipher text block C of a plain text block $P=(P_0, P_1, \ldots, P_{15})$ is obtained by $$\bigoplus_{i=0}^{15} T_i(P_i).$$

This encryption can be done based on the publicly available information (the lookup tables $T_i$). So, using this embodiment, only the look-up tables need to be made available to the encrypter. It is not necessary to reveal the matrix SHQ.

The decryption can only be done if one knows the private information. It works as follows. First, $S^{-1}$ is applied. This gives the value $$\bigoplus_{i=0}^{15} H(E \circ U(P_i, i)).$$

By BCH decoding the value $$\bigoplus_{i=0}^{15} E \circ U(P_i, i)$$

is derived. This value contains 15 or 16 ones depending on whether one of the $P_i$ satisfies U $(P_i,i)=0$. $U^{-1}$ is applied to each location of this value that contains a 1. From this the plaintext $P_0, P_1, \ldots, P_{15}$ can be derived.

The techniques disclosed herein may advantageously be applied in systems where public key cryptography is desired, but where, for example because of resource-constraints, computationally intensive solutions like RSA are less feasible.

Figure 4:
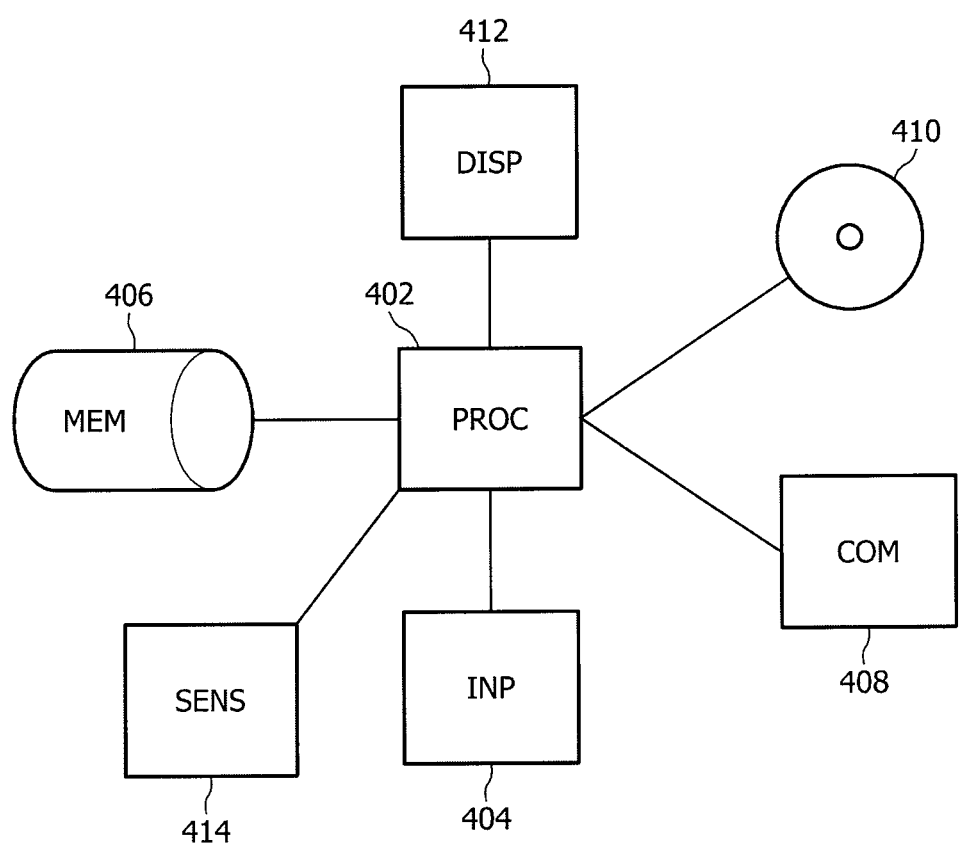
FIG. 4 illustrates a hardware architecture.

FIG. 4 illustrates an example hardware architecture suitable for implementing the systems and methods described herein at least partially in software. The software may be stored in memory 406, and the instructions of the software are executed by processor 402. The several processes may be initiated and user interaction possibilities may be provided using input 404 and display 412. The key data, look-up table values, plaintext, and/or ciphertext may be communicated via communications port 408 and/or removable media 410, for example. Communications port 408 may provide a connection with a local area network, the Internet, or a television network, for example. Such a connection may be wired or wireless. The removable media may comprise a CD or DVD reader and/or writer. Sensor 414 may be provided for acquiring sensed data. Sensor 414 may comprise, for example, a digital fingerprint sensor or an iris scanner. Alternatively, sensor 414 may comprise a medical scanning device such as an x-ray sensor or an ultrasound scanner. When an encryption system described herein is implemented in the software stored in the memory 406, the system may for example receive a plurality of look-up tables via communications port 408 or removable media 410. The system may encrypt data obtained via sensor 414, communications port 408, or removable media 410. The encrypted data may be stored locally in memory 406, or exported via communications port 408 or removable media 410. It is also possible to implement a method for generating an encryption system in software using the hardware architecture. For example, the software stored in memory 406 produces a plurality of look-up tables in the way set forth. Such look-up tables may be hard-coded into an encryption system, or may be transmitted via communications port 408 to a pre-programmed encryption system capable of receiving such look-up tables.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. It will also be appreciated that such a program may have many different architectural designs. For example, a program code implementing the functionality of the method or system according to the invention may be subdivided into one or more subroutines. Many different ways to distribute the functionality among these subroutines will be apparent to the skilled person. The subroutines may be stored together in one executable file to form a self-contained program. Such an executable file may comprise computer executable instructions, for example processor instructions and/or interpreter instructions (e.g. Java interpreter instructions). Alternatively, one or more or all of the subroutines may be stored in at least one external library file and linked with a main program either statically or dynamically, e.g. at run-time. The main program contains at least one call to at least one of the subroutines. Also, the subroutines may comprise function calls to each other. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth. These instructions may be subdivided into subroutines and/or be stored in one or more files that may be linked statically or dynamically.

The carrier of a computer program may be any entity or device capable of carrying the program. For example, the carrier may include a storage medium, such as a ROM, for example a CD ROM or a semiconductor ROM, or a magnetic recording medium, for example a floppy disc or hard disk. Further the carrier may be a transmissible carrier such as an electrical or optical signal, which may be conveyed via electrical or optical cable or by radio or other means. When the program is embodied in such a signal, the carrier may be constituted by such cable or other device or means. Alternatively, the carrier may be an integrated circuit in which the program is embedded, the integrated circuit being adapted for performing, or for use in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim.

The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method executed on a computer processor, for creation of an encryption and/or decryption system for encrypting and/or decrypting a plurality of plaintext words, the method comprising:
   associating respective plaintext words with respective sets of error positions of an error vector, comprising:
      allocating a set of error position of the error vector from a plurality of sets of error positions of the error vector to the plaintext word; and
   associating respective values of at least one of the plaintext words with respective error vector values at the set of error positions, comprising establishing a mapping between the values of plaintext word and the respective error vector values based on the set of error positions, and allocating identical values at positions outside the set of error positions associated with the one of the plaintext words.

2. The method according to claim 1, further comprising:
   associating the respective values of the plaintext word with respective representations of respective syndromes of the respective error vectors according to an error correcting code.

3. The method according to claim 1, wherein the respective representations associated with the respective values of a plaintext word span a linear space having a dimension which is larger than a dimension of a linear space spanned by the respective values of the plaintext word.

4. The method according to claim 1, wherein the respective sets of error positions are mutually disjunct.

5. The method according to claim 1, wherein the respective error vector values have at most one nonzero position.

6. The method according to claim 1, wherein the respective error vector values associated with the respective values of a plaintext word are mutually unique.

7. The method according to claim 1, further comprising providing a look-up table specifying the respective representations associated with the respective values of the plaintext word.

8. The method according to claim 1, wherein associating respective plaintext words with respective sets of error positions of the error vector comprises:
   evaluating the plaintext word to select the set of error positions.

9. The method according to claim 8, wherein associating respective plaintext words with respective sets of error positions of the error vector comprises:
   randomly selecting the set of error positions for each plaintext word; and randomly selecting the mapping.

10. A system for creating an encryption system for encrypting a plurality of plaintext words, the system comprising:
    a memory; and
    a computer processor configured for:
       associating respective plaintext words with respective sets of error positions of an error vector, comprising:
          allocating a set of error position of the error vector from the sets of error positions of the error vector to the plaintext word; and
       associating respective values of at least one of the plaintext words with respective error vector values at the set of error positions, comprising establishing a mapping the values of plaintext word and the respective error vector values based on the set of error positions, and allocating identical values at positions outside the set of error positions associated with the one of the plaintext words.

11. A system for encrypting a plurality of plaintext words, the system comprising:
    a computer processor for implementing table-looks up by using a plurality of look-up tables, the plurality of look-up tables corresponding to a plurality of plaintext words, the look-up table for receiving the corresponding plaintext word and outputting the respective representations of syndromes, wherein a look-up table corresponding to a plaintext word is arranged for associating respective values of that plaintext word with the respective representations of respective syndromes based on respective error vectors, wherein the respective error vectors associated with respective values of a plaintext word have identical values at positions outside a set of error positions associated with that plaintext word; and
    combining the representations of syndromes associated with the plaintext words into a ciphertext block.

12. The system according to claim 11, wherein the ciphertext generator comprises an XOR unit for combining the representations by means of XOR.

13. A method executed on a computer processor, for encryption of a plurality of plaintext word values, the method comprising:
    looking up respective representations of respective syndromes associated with respective values of respective plaintext words in a plurality of respective look-up tables corresponding to the respective plaintext words, the look-up table for receiving the corresponding plaintext word and outputting the respective representations of syndromes, wherein a look-up table corresponding to a plaintext word is arranged for associating respective values of that plaintext word with respective representations of respective syndromes based on respective error vectors, wherein the respective error vectors associated with respective values of a plaintext word have identical values at positions outside a set of error positions associated with the plaintext word; and
    combining the representations of syndromes associated with the respective plaintext words into a ciphertext block.

14. A system for decrypting a ciphertext block, the system comprising:
    a computer processor configured for:
       recovering an error vector corresponding to a syndrome depending on the ciphertext block according to an error-correcting code; and
       looking up a value of a respective plaintext word in dependence on at least one value of the error vector at an error position of the error vector associated with the respective plaintext word by using a plurality of look-up tables for a plurality of plaintext words, the look-up table for mapping between the corresponding plaintext word and the respective representations of syndrome values based on the respective set of error positions of the error vector.

15. A method executed on a computer processor, for decryption of a ciphertext block, the method comprising:
- recovering an error vector corresponding to a syndrome depending on the ciphertext block according to an error-correcting code;
- looking up a value of a respective plaintext word in dependence on a value of the error vector at an error position of the error vector associated with the respective plaintext word by using of look-up tables for a plurality of plaintext words, the look-up table for mapping between the corresponding plaintext word and the respective representations of syndrome values based on the respective set of error positions of the error vector.

16. A computer program product comprising machine readable instructions stored on a non-transitory computer readable medium for causing a processor to perform a method of creating an encryption or decryption system for encrypting or decrypting a plurality of plaintext words, the method comprising:
- associating respective plaintext words with respective sets of error positions of an error vector, comprising:
  - allocating a set of error position of the error vector from the sets of error positions of the error vector to the plaintext word; and
- associating respective values of at least one of the plaintext words with respective error vector values at the set of error positions, comprising establishing a mapping between the values of plaintext word and the respective error vector values based on the set of error positions, and allocating identical values at positions outside the set of error positions associated with the one of the plaintext words.

17. A computer program product comprising machine readable instructions stored on a non-transitory computer readable medium for causing a processor to perform a method of encrypting a plurality of plaintext word values, the method comprising:
- looking up respective representations of respective syndromes associated with respective values of respective plaintext words in a plurality of respective look-up tables corresponding to the respective plaintext words, the look-up table for receiving the corresponding plaintext word and outputting the respective representations of syndromes, wherein a look-up table corresponding to a plaintext word is arranged for associating respective values of that plaintext word with respective representations of respective syndromes based on respective error vectors, wherein the respective error vectors associated with respective values of a plaintext word have identical values at positions outside a set of error positions associated with the plaintext word; and
- combining the representations of syndromes associated with the plaintext words into a ciphertext block.

18. A computer program product comprising machine readable instructions stored on a non-transitory computer readable medium for causing a processor to perform a method of decrypting a ciphertext block, the method comprising:
- recovering an error vector corresponding to a syndrome depending on the ciphertext block according to an error-correcting code;
- looking up a value of a respective plaintext word in dependence on a value of the error vector at an error position of the error vector associated with the respective plaintext word by using a plurality of look-up tables for a plurality of plaintext words, the look-up table for mapping between the corresponding word and the respective representations of syndrome values based on the respective set of error positions of the error vector.

* * * * *